Sept. 7, 1965  R. A. LONG ETAL  3,204,334
LEAD-MAKING METHOD AND APPARATUS
Filed Nov. 7, 1962  10 Sheets-Sheet 9

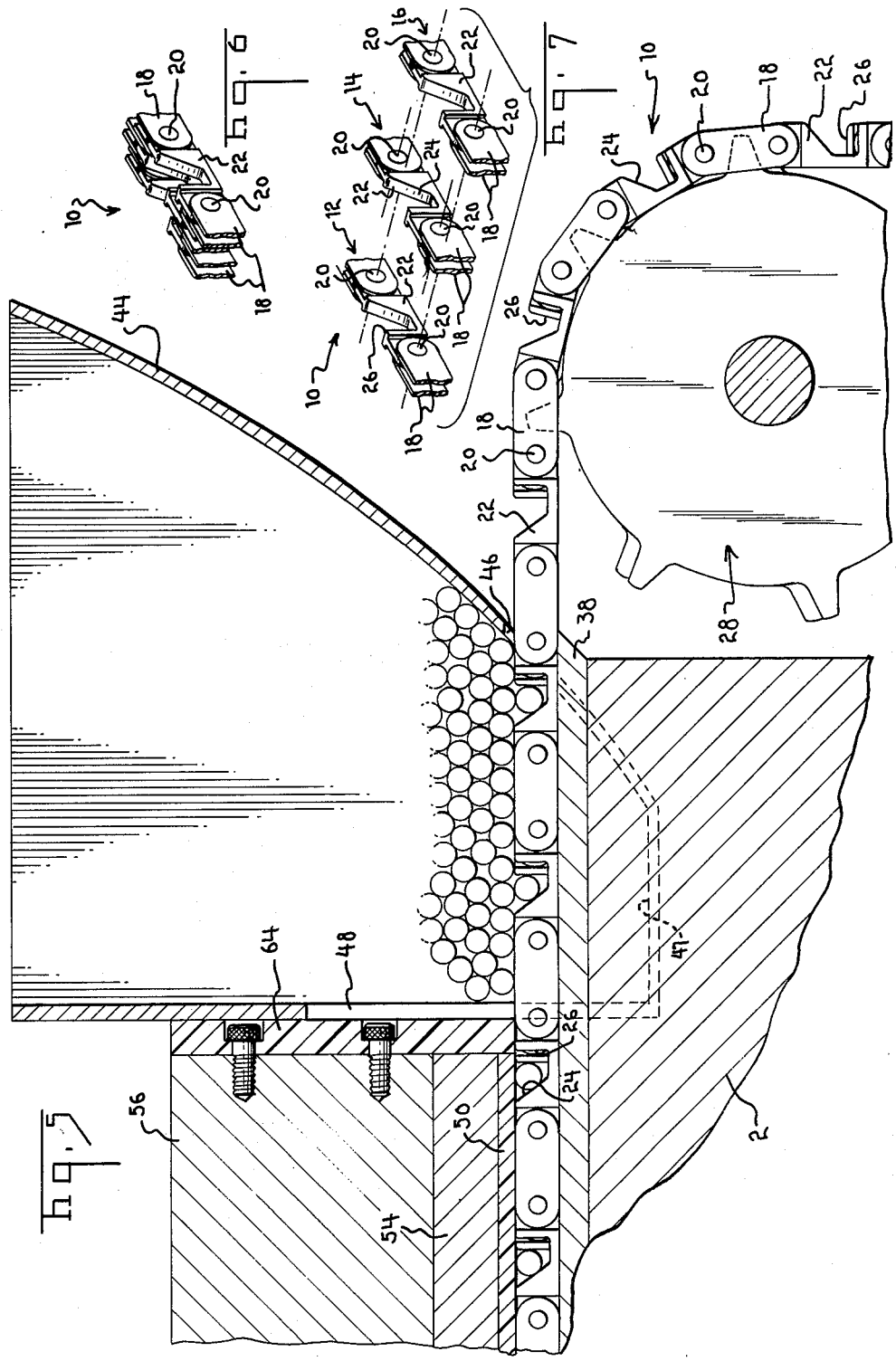

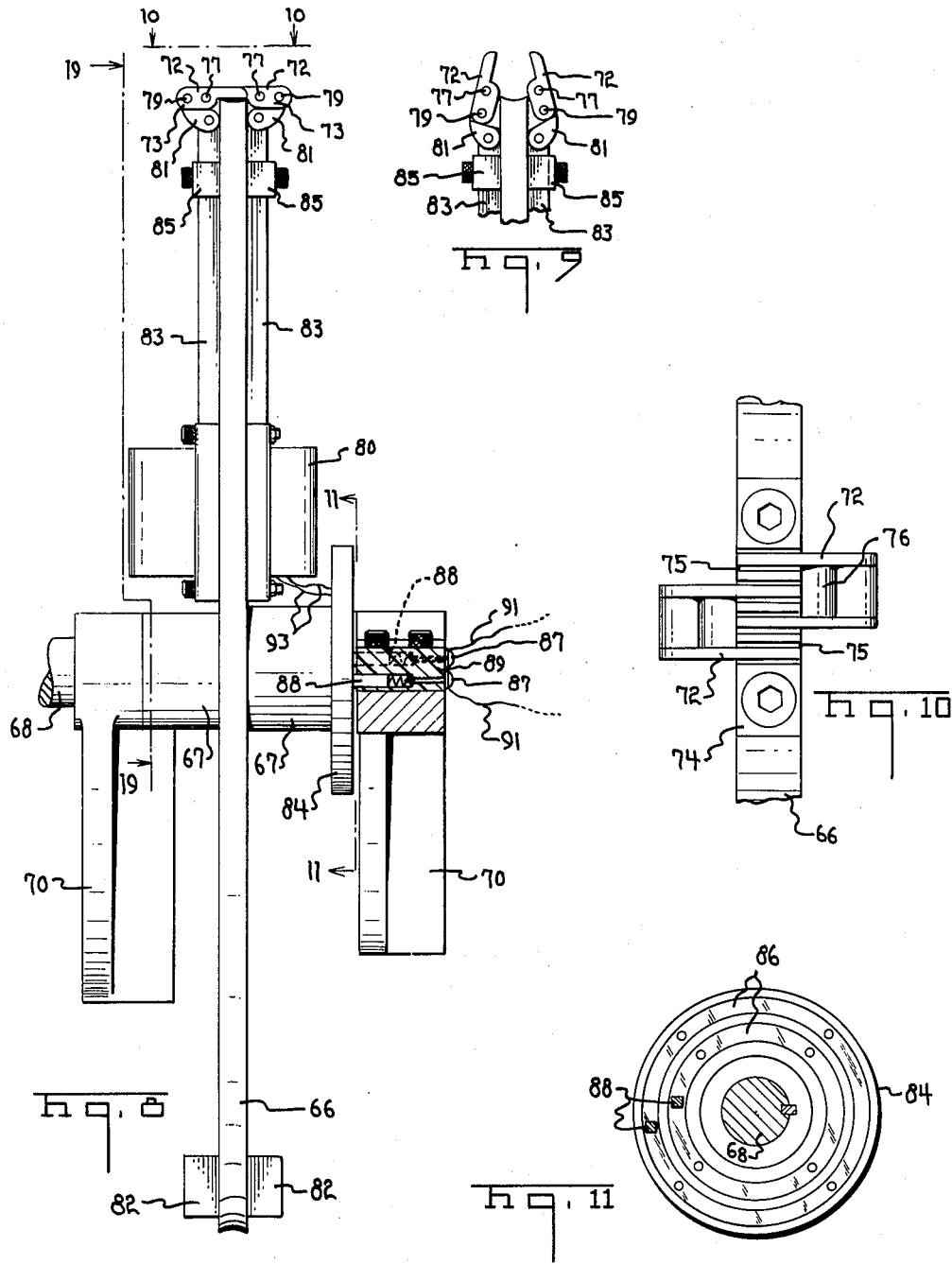

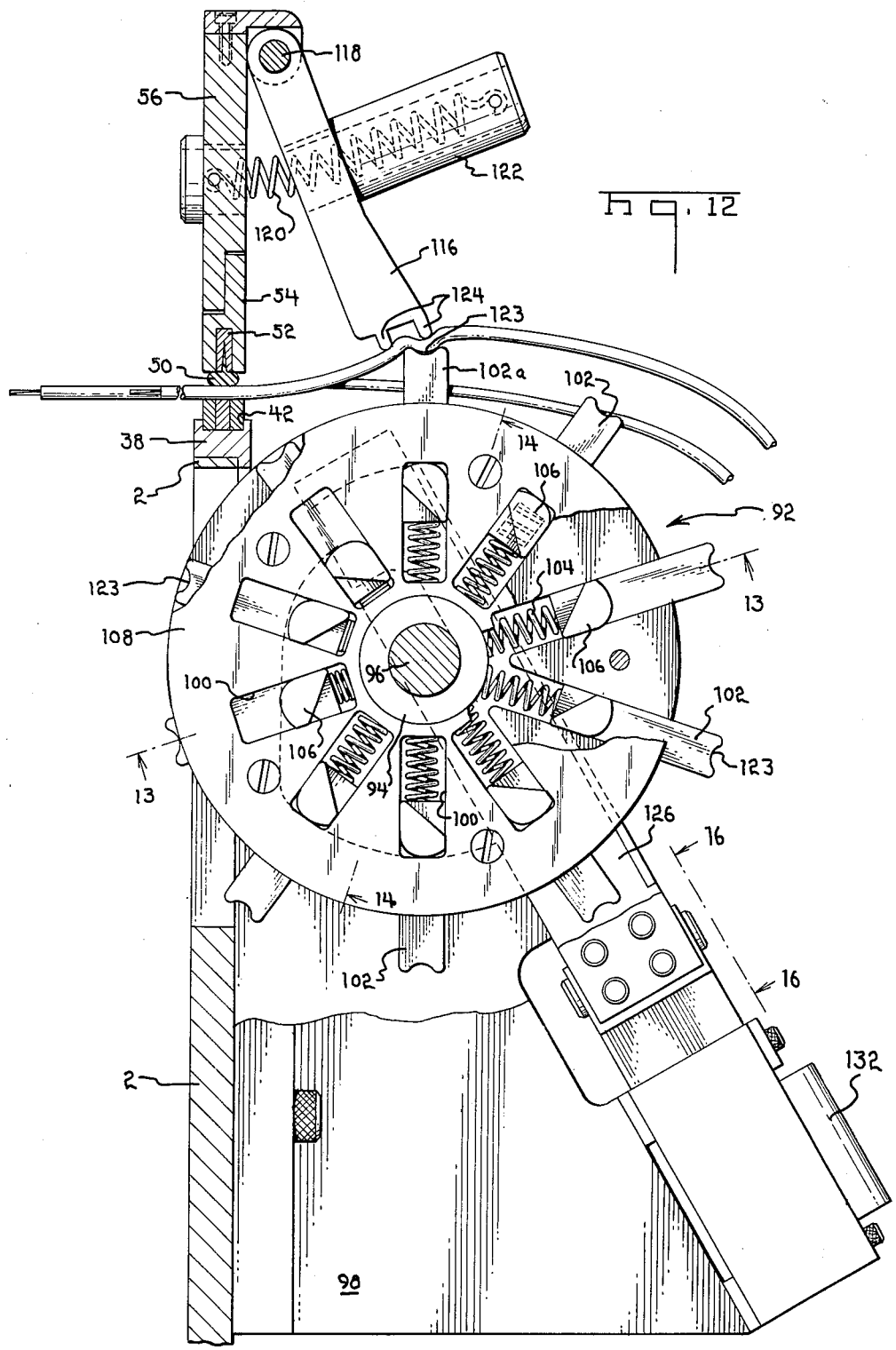

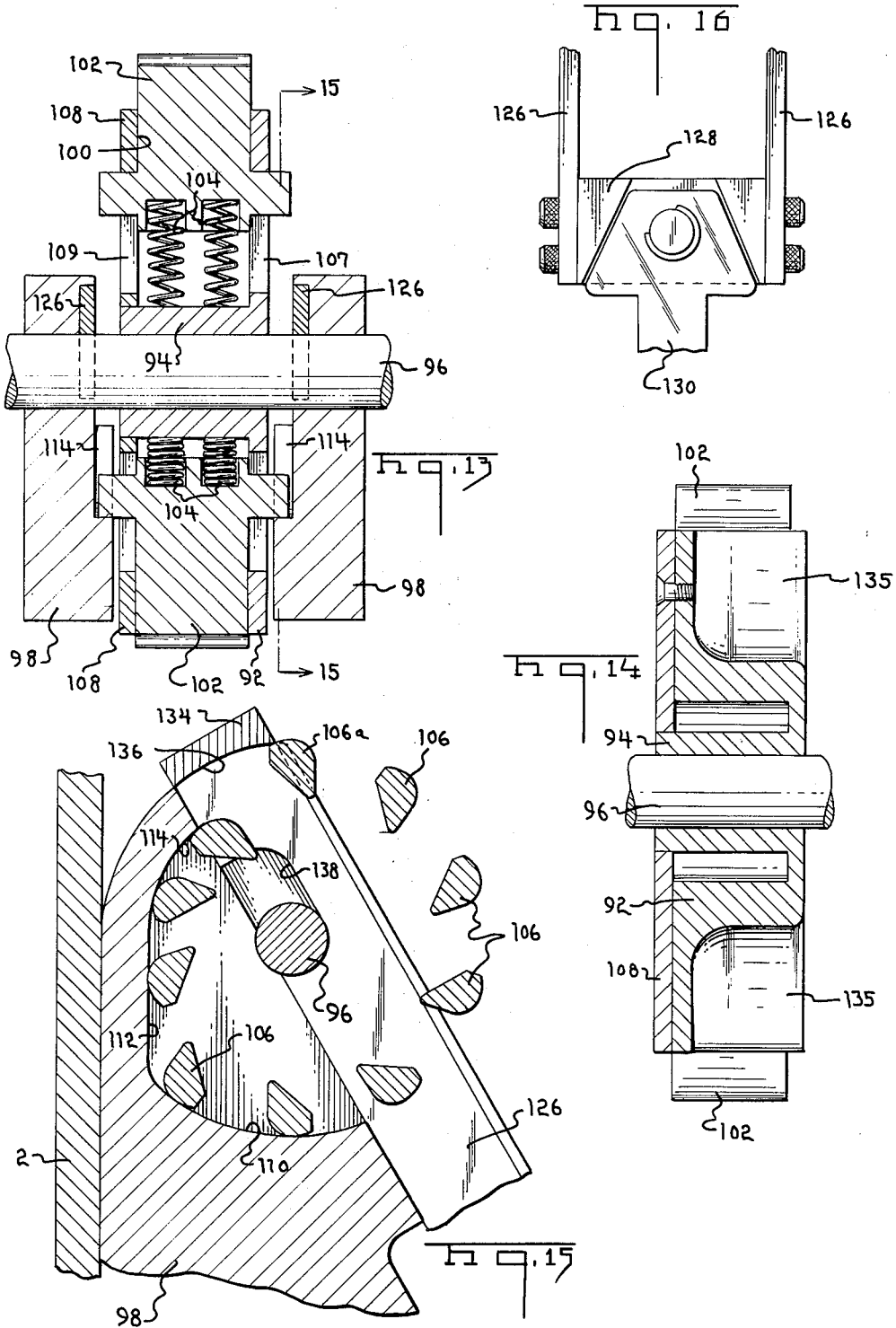

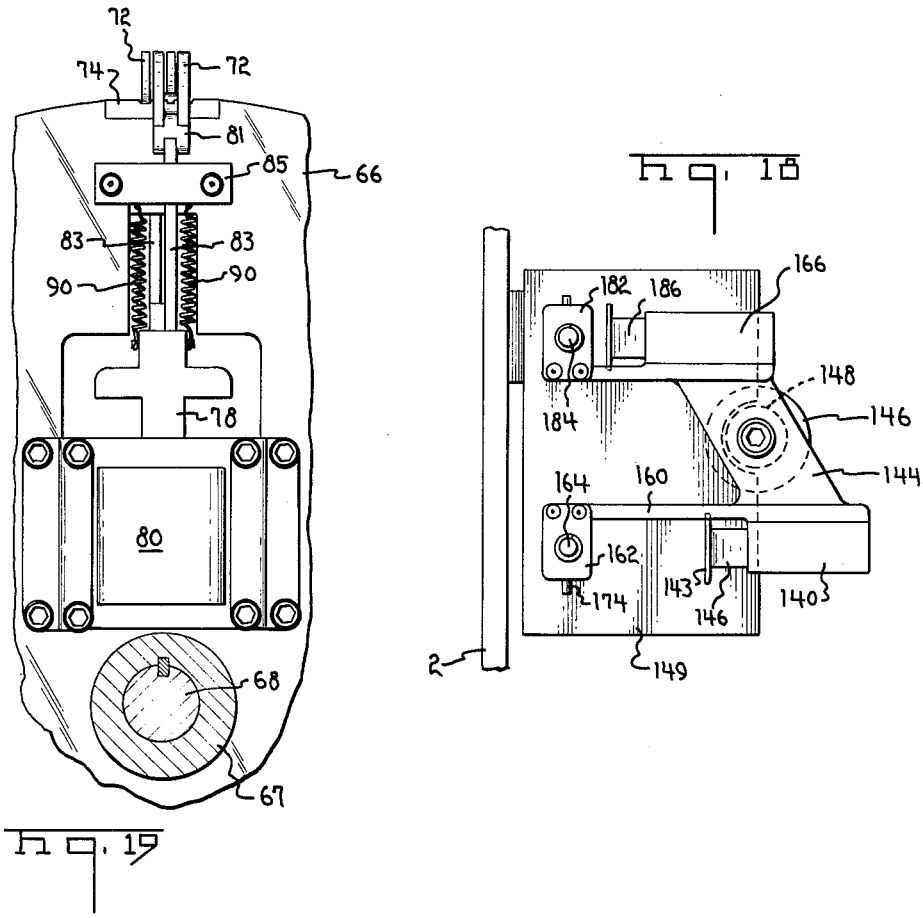

United States Patent Office 3,204,334
Patented Sept. 7, 1965

3,204,334
LEAD-MAKING METHOD AND APPARATUS
Robert A. Long, Harrisburg, Charles M. Lovendusky, Enola, and John R. Vickery, York, Pa., assignors to AMP Incorporated, Harrisburg, Pa.
Filed Nov. 7, 1962, Ser. No. 236,090
19 Claims. (Cl. 29—509)

This invention relates to methods and apparatus for handling individual lengths of material such as individual wires, the disclosed embodiment of the invention comprising a method and apparatus for making electrical leads.

An object of the invention is to provide an improved method and apparatus for withdrawing individual lengths of material from a bundle and conveying the individual lengths along a predetermined path. A further object is to provide an improved method and apparatus for manufacture of electrical leads. A still further object is to provide a lead making method and apparatus which is adaptable to produce leads of varying lengths. A still further object is to produce a substantially fully automatic high speed lead making machine in which the type of terminal applied to the lead or the length of the lead can be varied without substantial machine modifications.

These and other objects of the invention are achieved in a preferred embodiment comprising a triangular plate having a conveyer chain movable around its edges in a closed circuit. The conveyer chain has spaced-apart wire gripping devices thereon each of which is adapted to hold an individual length of wire at one point intermediate its ends in a manner such that the wire can be pulled axially relative to the chain for positioning purposes. Means are provided for delivering individual lengths of wire to the gripping devices and a crimping press is mounted on each side of the path of the conveyor chain and at different locations relative to the path of movement of the chain. Adjacent to, but upstream from, each of the crimping presses, wire pulling means are provided for pulling the wires individually axially with respect to the chain. A first wire pulling means pulls the wire in a first direction to locate a first end of each wire at a distance from the chain such that the first end is presented to the first crimping press. Thereafter, a second pulling means pulls the wire in the opposite direction to locate the second end in the second press. These positioning devices comprise wheels rotatable upon axes extending parallel to the path of movement of the chain and having means on their peripheries for gripping each wire and pulling it transversely of the direction of movement of the chain. In the preferred embodiment, two such wheels are associated with each crimping press, the first wheel achieving a relatively crude adjustment of the position of the end of the wire and the second wheel achieving the final adjustment so that the end of the wire is precisely positioned with respect to the press. After each length of wire has had a terminal crimped onto each of its ends, it is automatically released by its gripping device and falls into a suitable receptacle disposed beneath the chain.

In the drawing:

FIGURE 5 is a fragmentary sectional view showing the upper righthand corner of the apparatus as it appears in FIGURE 1 and particularly showing the manner in which the conveyer chain receives individual wires from a bin containing a bundle of wires.

FIGURE 6 is a perspective view of a short section of the conveyer chain assembly.

FIGURE 7 is an exploded view of the chain assembly of FIGURE 6.

FIGURE 8 is an end view on an enlarged scale of a large positioning wheel which roughly or crudely positions the individual wires with respect to the conveying chain.

FIGURE 9 is a fragmentary view showing only the gripping fingers or clamping mechanism of the positioning wheel of FIGURE 8 in the open position.

FIGURE 10 is a view taken along the lines 10—10 of FIGURE 8.

FIGURE 11 is a view taken along the lines 11—11 of FIGURE 8.

FIGURE 12 is a view taken along the lines 12—12 of FIGURE 3 and showing the smaller one of the positioning wheels by means of which the individual wires are pulled during conveyance thereof by the chain.

FIGURES 13 and 14 are views taken along the lines 13—13 and 14—14 of FIGURE 12.

FIGURE 15 is a view taken along the lines 15—15 of FIGURE 13.

FIGURE 16 is a view taken along the lines 16—16 of FIGURE 12.

Figure 4:
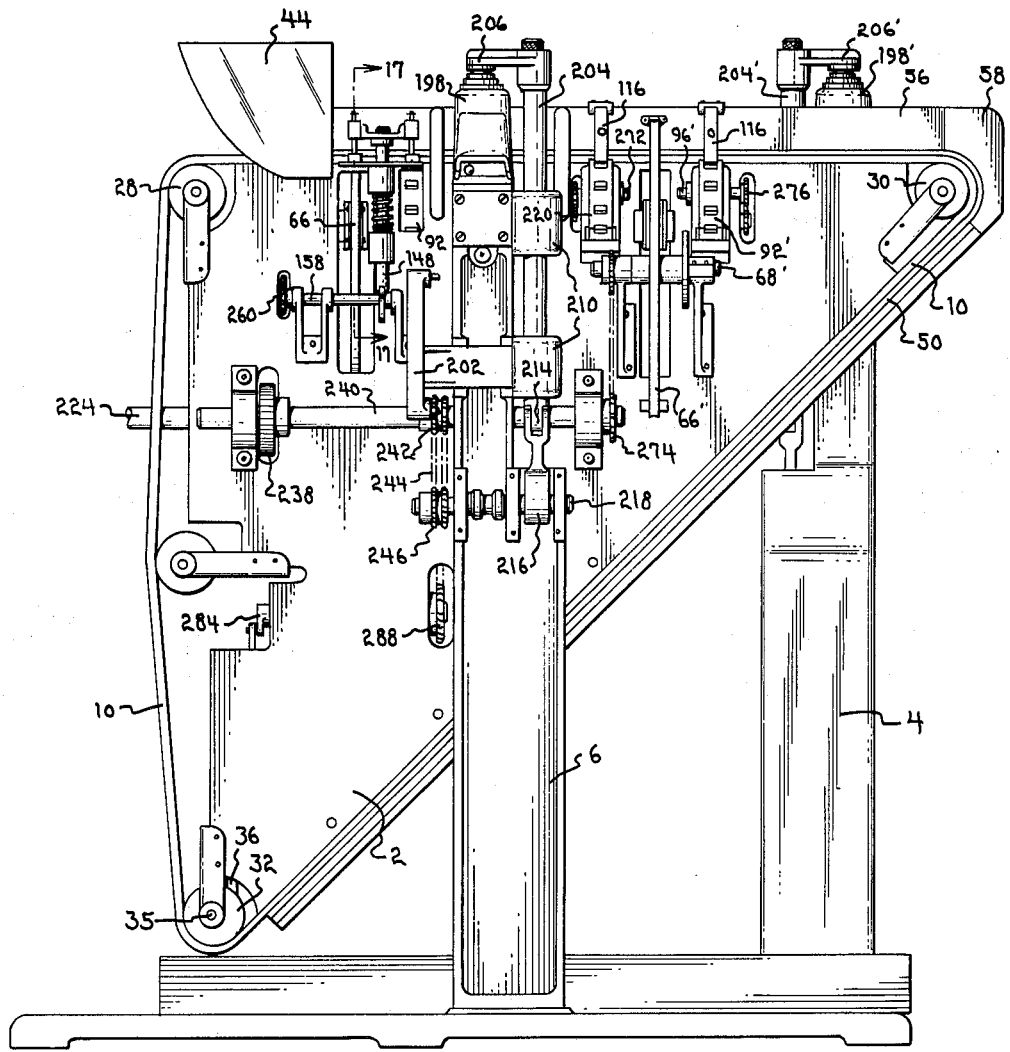
FIGURE 4 is a view of the opposite side of the apparatus or machine from that shown in FIGURE 3.
Figure 17:
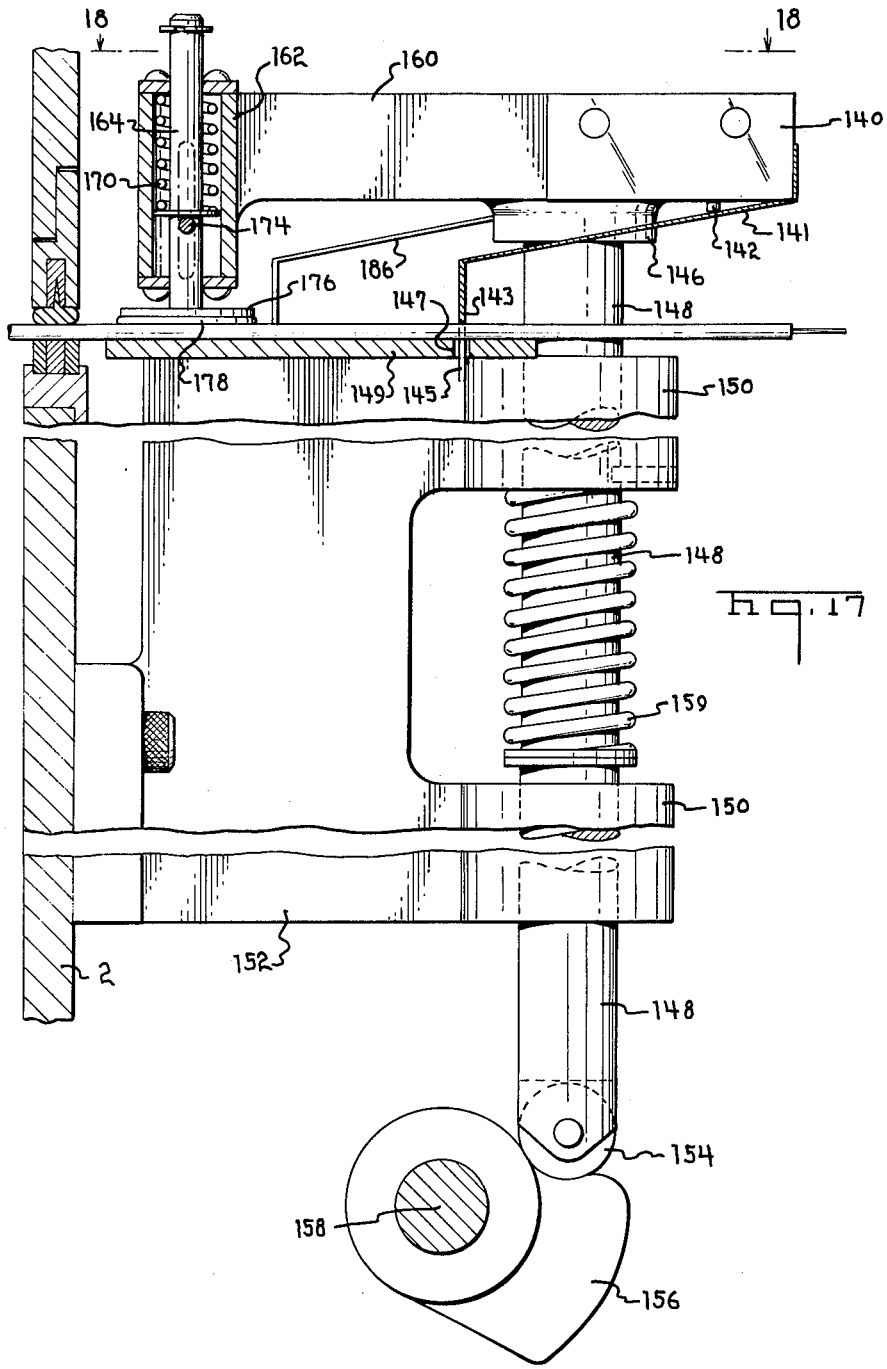

FIGURE 17 is a view taken along the lines 17—17 of FIGURE 4 showing a braking mechanism and a switch mechanism which controls the operation of the wire positioning wheels identified above.

FIGURE 18 is a top view looking along the lines 18—18 of FIGURE 17 of the braking and switch mechanism.

FIGURE 19 is a view taken along the lines 19—19 of FIGURE 8.

Figure 2:
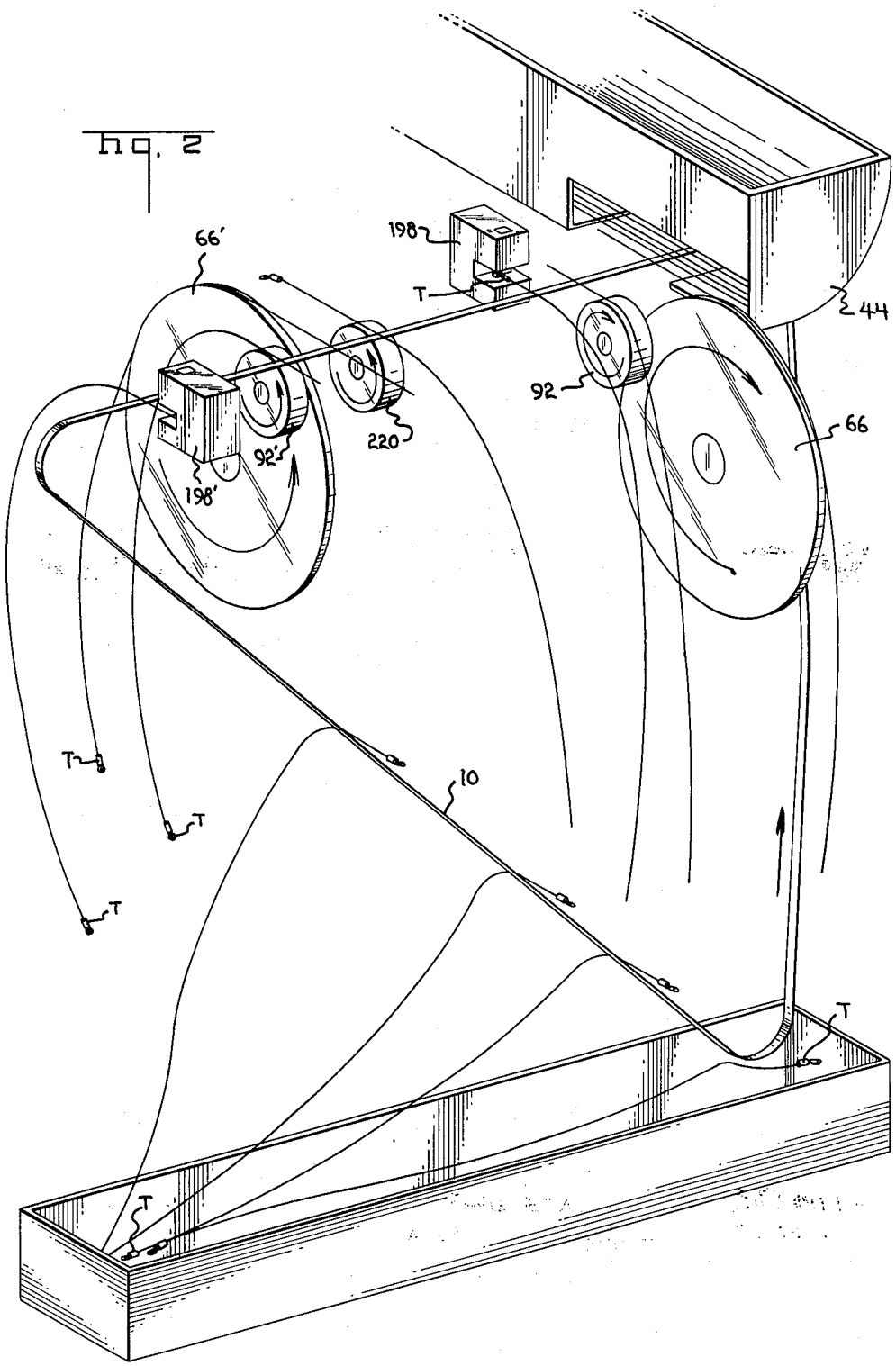
FIGURE 2 is a schematic perspective view showing only the most important elements of the apparatus of FIGURE 1 and illustrating the mode of operation of the preferred embodiment.

The essential principles of the invention are illustrated in FIGURE 2 which shows only a few of the most important elements of a preferred embodiment of an apparatus for carrying out the invention and indicates the manner of their operation. A conveyer 10 is moved along a generally triangular path through the lower portion of a bin 44 in which a bundle of electrical leads reposes. As the conveyer chain passes through the bin, lead gripping devices on the chain each pick upon one of the electrical leads and present it to a first crimping press 198 where an electrical terminal is attached to one end of the lead. It is necessary to move each lead rightwardly to position this first end at the proper distance from the conveyer for the crimping operation in the press 198. Such positioning of the wire is achieved by a pair of positioning wheels 66, 92 which have means on their peripheries to grip the wire and pull it axially while it is being held by the gripping device on the chain. The first positioning wheel 66 moves the individual wires each a relatively great distance and roughly positions the end of each lead for the crimping operation. The smaller positioning wheel 92 moves at a much lower speed and moves the individual wires only a short distance for final or precise positioning. After the first terminal has been applied to the first end of each wire, the wires pass to a second small wheel 220 which moves them individually axially a short distance in order that their ends may be gripped by gripping devices on a second large wheel 66'. After the wires are axially pulled leftwardly a substantial distance by the second large wheel, a second small wheel 92' positions the wires precisely so that the remaining end of each lead is properly located with respect to the conveyer 10 for crimping a terminal onto this other end in the crimping press 198'. The leads are then fully completed and may be transported down along the slanted side or hypotenuse of the triangle of the conveyer path and released at the lower apex where they are permitted to drop into a tote box as shown.

Figure 1:
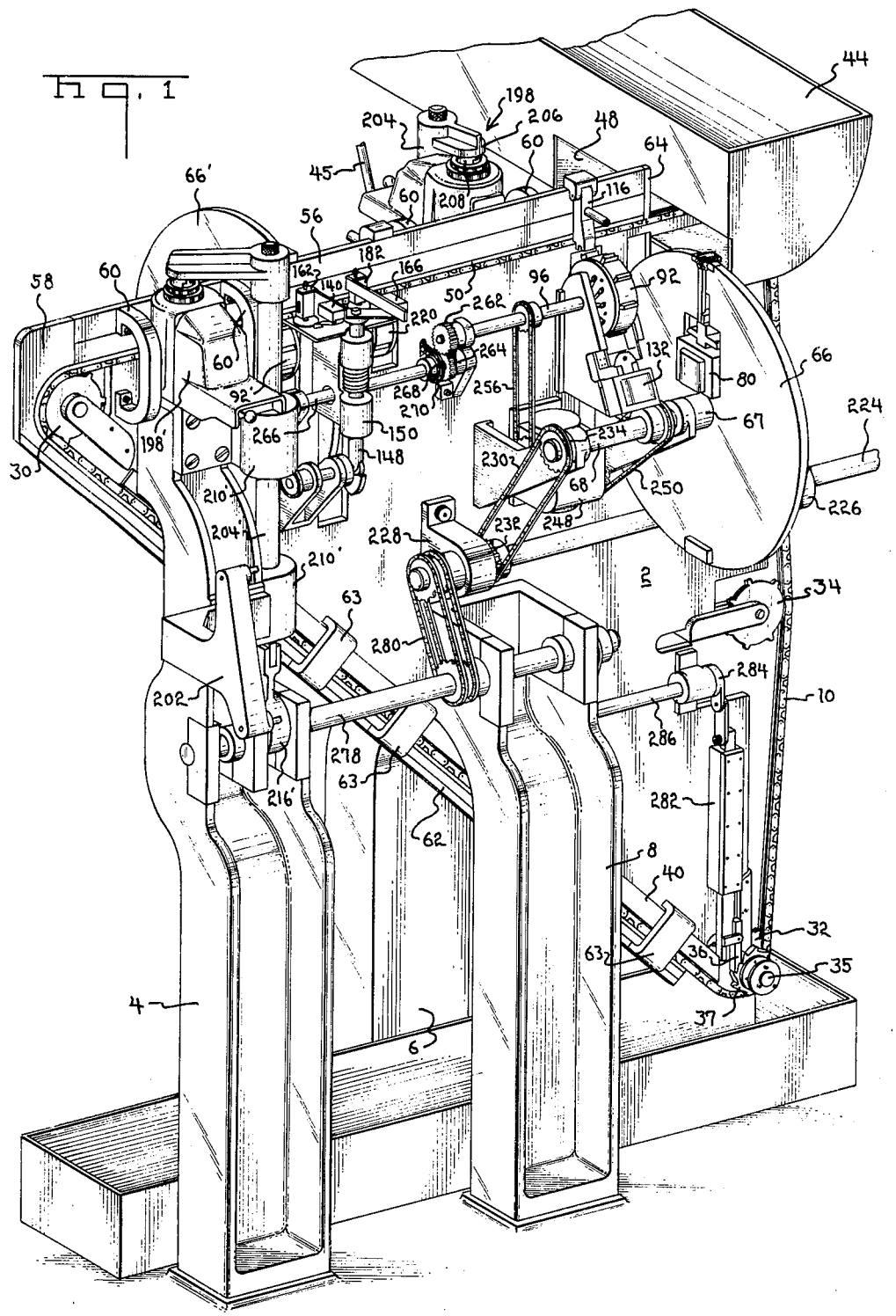
FIGURE 1 is a perspective view of an apparatus in accordance with a preferred embodiment of the invention.
Figure 3:
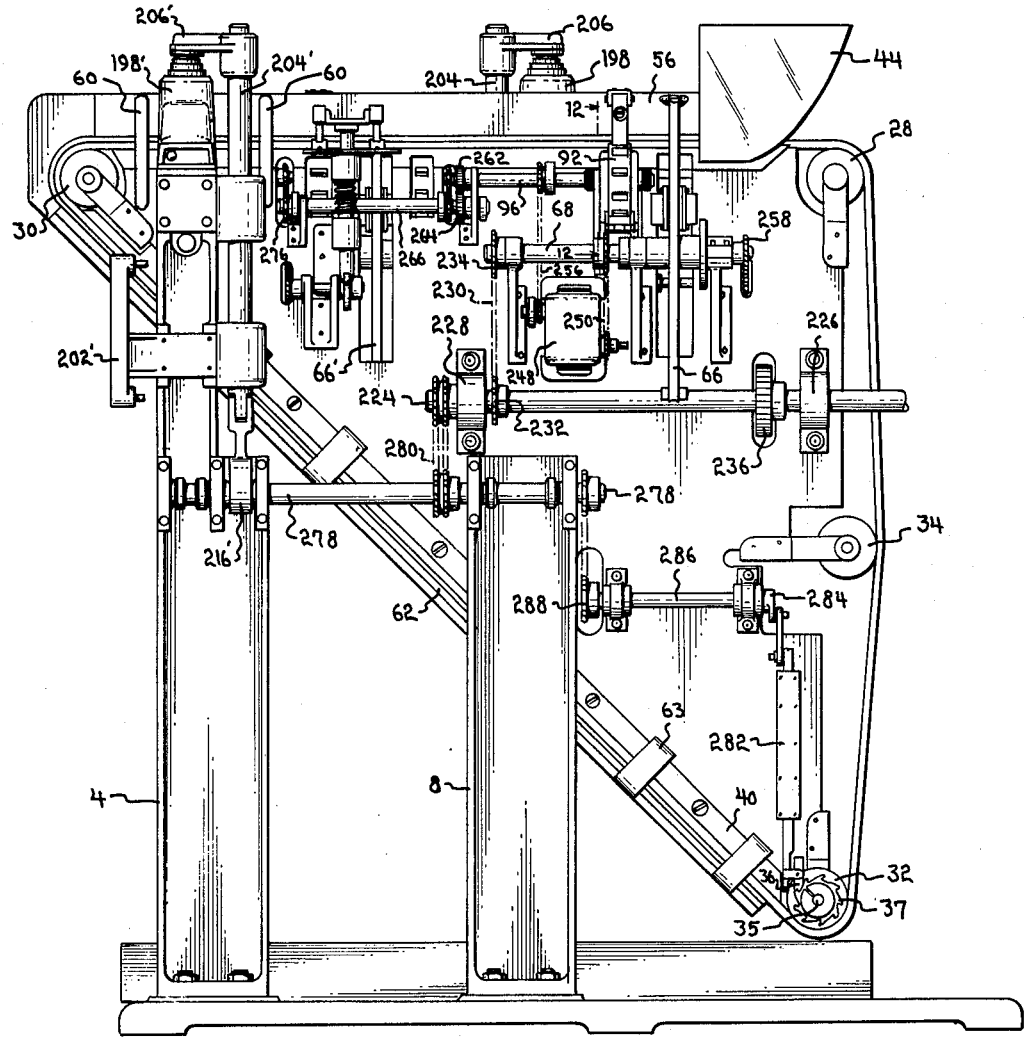
FIGURE 3 is a side view of the apparatus of FIGURE 1.

Referring now to FIGURES 1, 3, and 4, there is shown a specific form of apparatus in accordance with the invention comprising a frame plate 2 in the shape of a right triangle which is supported in an upright position with one side horizontal by means of support legs 4, 6, 8. A conveyer chain assembly 10 for wires is periodically and intermittently moved, index fashion, around the edges of the frame 2. The conveyer chain assembly 10 (FIGURE 7) comprises three identical chains 12, 14, 16, in side-by-side relationship, each chain being composed of alternate pairs of parallel link plates 18 which are pivoted at each end 20 to the alternate wire holding links 22. These wire holding links have a central notch with one slanted side 24, and one relatively sheer side 26. In use, the three individual chains of the chain assembly are positioned close to each other so that the coinciding notches of the individual wire holding links present an open notch in the chain profile as is apparent from FIGURE 5. The relative position of the center chain 14 with respect to the outside chains 12, 16 will determine the effective size of this notch in that if the three individual chains are in perfect alignment, the notch will present the largest possible profile while the profile will be reduced in size if the center chain is displaced linearly with respect to the aligned outer chains 12, 16.

When the center chain is adjusted to change the notch size this center chain should be moved leftwardly in FIGURE 9 so that the straight sides 26 of its notches are on the right. Each notch will then have only one trailing side (the side 26 of the center chain) and only one wire will move into each notch.

Chain assembly 10 passes over guide sprockets 28, 30, a drive sprocket 32, and an idler sprocket 34. The drive sprocket 32 is mounted on a shaft 35 adjacent to a ratchet wheel 37 which is periodically indexed by means of a reciprocable pawl 36. The sprockets 28 and 30 which are located at the upper apices of the triangular frame are formed of three separate individually rotatable sprocket plates, one for engagement with each of the chains 12, 14, 16. The drive sprocket 32 has three similar sprocket plates but these are adjustably secured in a fixed position with respect to each other. It will thus be apparent that if it is desired to change the effective size of the individual notches in the conveyer chain assembly it is merely necessary to change the angular position of the center sprocket plate of the drive sprocket assembly 32 with respect to the outer sprocket plates. The sprocket plate of the guide sprockets and the idler sprocket will then adapt themselves to the adjusted positions of the plates in the drive sprocket.

Chain assembly 10 is guided along its path of movement by means of a guide track 38 (FIGURE 12) mounted on the upper edge of the frame 2 and a similar guide track 40 on the lefthand edge or hypotenuse of the frame. The lower edge of chain assembly 10 is received within a channel 42 in these guide plates so that the three chain sections are held relatively snugly against each other during their travel along the upper edge and the hypotenuse of the frame.

A wire holding bin 44 mounted at the upper right-hand apex of the frame as viewed in FIGURE 1 extends normally of the plane of frame plate 2 and is supported by a suitable support bracket indicated at 45. Chain assembly 10 passes through a transverse slot 46 in the lower portion of the bin at a level substantially above the floor 47 thereof. The bundle of leads in the bin thus rests upon the floor 47 for a substantial portion of the length of the bundle while one end of the bundle rests upon the chain assembly. As the chain moves through the bin an individual wire lead from the bottom of the bundle drops into each of the notches in the chain assembly. The leads in the notches are pulled leftwardly in FIGURE 5 through an opening 48 in the bin and drawn along the path of movement of the conveyer chain. In order successfully to extract the individual leads from the bundle in this manner, the cross sectional areas of the notches should be such that only one lead will fit in each notch. The provision of the linearly adjustable center chain 14 permits this requirement to be met for wires of varying diameters.

A resilient pressure pad means 50 (FIGURES 5 and 12) bears against the chain along the upper edge of the frame and along the hypotenuse. This pressure pad may comprise a suitable tough resilient plastic material or a woven wire gasketing and is held in position by having its one side pinched in a narrow opening in an insert 52 in a chain retainer plate 54. The chain retainer plate is coextensive with the chain on the upper side of the frame and extends to an end guide plate 58 in which the pressure pad means is similarly mounted. Chain retainer plate 54 is bolted or otherwise secured to a mounting plate 56 which extends along the upper edge of the frame and above the chain and is secured to the main frame 2 by means of suitable C-shaped brackets 60. The hypotenuse portion of the path of the conveyer has a chain retainer plate 62 which is similar in appearance and function to the plate 54. This plate is directly clamped to frame 2 by means of brackets 63.

After the individual wire leads are extracted from the bundle and drawn through the opening 48 in the bin they will thus be firmly but yieldingly held in their individual notches by the pad 50. In order to facilitate the passage of the individual leads in the notches from the bin to the portion of the track extending leftwardly from the bin, and in order to prevent damage to the leads during such passage, a plastic strip 64 is mounted against the right-hand ends of the plates 54, 56 as shown in FIGURE 5.

It will be apparent from FIGURE 1 that as the individual leads are extracted from the bundle in the bin and as the chain moves leftwardly in this figure through the opening 48 in the side of the bin, most of the length of each lead will extend over the lefthand or far side of the frame member 2. A first positioning wheel 66 (FIGURE 8) functions to pull a substantial portion of each lead rightwardly in FIGURE 1 to locate its lefthand end in approximate position for crimping an electrical terminal thereto at a subsequent crimping station. This positioning wheel 66 has hubs 67 through which a shaft 68 extends and to which the wheel is keyed or otherwise secured. Brackets 70 are provided on each side of the wheel to provide bearing support for the shaft in the immediate vicinity of the positioning wheel.

As best shown in FIGURES 8–10, one pair of fingers 72 are provided on each side of the wheel for clamping the individual wires against the edge of the wheel. These fingers are pivoted intermediate their ends at 77 to ears 76 which extend from a clamping plate 74 on the periphery of the wheel. This clamping plate 74 has transverse grooves 75 extending across its surface into which the fingers are movable when they move from their open position (FIGURE 9) to their closed interdigitated position (FIGURE 8) so that a wire extending between the fingers is sinuously flexed and clamped against the plate. At their outer ends, the fingers are enlarged as shown at 73 and are pivotally secured at 79 to links 81. These links are pivoted to connecting rods 83 which extend downwardly through guides 85 toward the center of the wheel. The ends of the rods 83 are secured to the plunger 78 of a solenoid 80 mounted in an opening in the wheel. Springs 90 are secured at one end to the solenoid plunger 78 and at their opposite ends to the wheel and normally hold the solenoid plunger 78 in its outward position thereby normally to maintain the fingers in their closed position of FIGURE 8. Upon energization of the solenoid, the fingers are opened and a wire clamped against the clamping plate is released. With this arrangement, the wires are clamped with spring pressure and it is therefore unnecessary to make adjustments for different wire sizes.

Power is supplied to the solenoid 80 by means of leads 93 which extend from the solenoid to circular conductors 86 mounted on a face of a disc 84 of insulating material. This disc is secured to the righthand hub 67 in FIGURE 8 of the wheel for rotation therewith. The circular conductors are contacted by spring biased brushes 88 mounted in an insulating block 89 which is secured to an arm extending from the bracket 70. The brushes in turn, are electrically connected to an external voltage source 91 by means of screws 87.

Advantageously a counterweight 82 is provided on the periphery of wheel 66 diametrically opposite to the fingers 72 for balancing this wheel which rotates at a relatively high speed during use.

Positioning wheel 66 makes a single revolution during each cycle of operation of the apparatus. During each revolution, the normally closed gripping fingers are opened by energization of solenoid 80 to release a wire being pulled when the end of the wire is roughly positioned for the first crimping operation. The opening of the fingers will take place at an angular position of the fingers which will depend upon the length of the lead being handled but such energization of the solenoid and opening of the fingers will not take place later than about the eight o'clock position of the fingers (assuming the fingers are in the twelve o'clock position in FIGURE 1 as a reference). The fingers will then always be open as they move from the eight o'clock to the eleven o'clock position during which interval the chain 10 is indexed. The next adjacent wire in the chain will then be positioned in the plane of wheel 66 so that as the fingers move through the eleven o'clock position they can be closed to grip this next wire and pull it axially relative to the notch in which it is held. The control means for energizing and deenergizing the solenoid 80 is described fully below.

Final positioning of the wire for the first crimping operation is achieved by means of a small positioning wheel 92 (FIGURES 12–16) which has a hub 94 keyed or otherwise secured to a shaft 96 which is rotatably mounted in brackets 98 secured to frame member 2. Wheel 92 has a plurality, ten in the disclosed embodiment, of radially inwardly extending recesses 100 evenly spaced around its periphery in which there are mounted plungers 102 which normally are biased beyond the surface of the wheel by means of springs 104 acting between the hub 94 of the wheel and the underside of the plungers. Plungers 102 have arms 106 on their sides, one of which extends through a slot 107 in the wheel 92 and the other of which extends through a slot 109 in a cover plate 108 secured to the side of the wheel, see FIGURE 13. The arms 106 have curved surfaces which engage contoured cam surfaces 110, 112, 114 on the opposed faces of the brackets 98, these cam surfaces being arranged to depress the plungers or move them inwardly as the individual plungers move towards the surface of the frame plate 2. Referring to FIGURE 15, at the eleven o'clock position of each individual plunger, the dropoff at the cam section 114 permits radial outward movement of the plungers under the influence of the springs.

As best shown in FIGURE 12, plungers 102 are adapted to cooperate with an arm 116 pivoted at 118 to plate 56 and which is normally biased towards the surface of plate 56, that is in a clockwise direction in FIGURE 12, by means of an extensible spring 120 secured to the plate 56 at one end and secured to the bottom of a recess of a spring housing 122 on the arm 116 at its opposite end. At its lower end, arm 116 has spaced apart fingers 124 which cooperate with an inwardly curved surface 123 of the individual plungers 102 to lightly kink and grip the individual wires. Thus, a wire gripped as indicated in FIGURE 12 will be pulled rightwardly as the wheel 92 rotates in a clockwise direction.

A pair of arms 126 extend diametrically and slidably across wheel 92 on each side thereof in guideways defined by a lip 127 on the opposing faces of the brackets 98. At their upper ends, arms 126 have inwardly directed flanges 134, the undersides 136 of which are curved to conform to the surfaces of the arms 106 of the plungers 102. The lower ends of arms 126 are secured to an adapted block 128 (FIGURE 16) on the end of a solenoid plunger 130 of a solenoid 132. Normally, the solenoid plunger 130 is in its outward position and is biased to this position by the springs 104 acting through the adjacent plunger 102 and against the surfaces 136 of the arms. Upon energization of the solenoid, the arms are moved downwardly as viewed in FIGURE 15 and the adjacent one of the plungers (indicated as 106a) is pulled inwardly for purposes described immediately below. Notches 138 are provided in the arms to permit their movement past shaft 96.

FIGURE 12 shows the positions of the parts when the foremost wire in this view is almost precisely positioned at the proper distance from the surface of the chain 10 for the crimping operation. Bearing in mind that wheel 92 rotates in a clockwise direction as viewed in this figure, it will be apparent that radial inward movement towards hub 94 of the uppermost (twelve o'clock) plunger 102a in FIGURE 12 would cause release of the wire from clamped engagement so that it would not be moved further rightwardly in this figure. Such inward movement of the twelve o'clock plunger 102a is achieved by downward movement of the solenoid and the arms 126 which pull the arms 106 of the plunger downwardly. It should be added that the solenoid is energized by a control device for the power supply described immediately below, only when the foremost wire in FIGURE 12 is properly positioned for the crimping operation. After the solenoid arms 26 are pulled downwardly and the wire is released, the clamping arm 116 will swing clockwise about its pivotal axis 118 under the influence of the spring 120. Shortly thereafter, the chain will be indexed and the next adjacent lead wire in the chain will be positioned over the eleven o'clock plunger of the wheel 92. As this plunger passes the fall off 114 of the cam, it will be projected outwardly under the influence of its springs 104 and in cooperation with the fingers 124 of arm 116 will clamp the next adjacent wire. Further clockwise movement of the wheel 92 until the next adjacent plunger reaches the twelve o'clock position will result in a pulling of the next lead until the solenoid 132 is again energized.

As shown in FIGURE 14, open sided recesses 135 extend inwardly from the righthand side and from the peripheral surface of the wheel between the radial recesses 100. These former recesses are provided for the purpose of permitting the individual wires to be moved from the right in FIGURE 14 until they extend from the chain over the periphery of the wheel.

FIGURES 17 and 18 show the details of the switch control devices for energizing the solenoid 80 of the large positioning wheel and the solenoid 132 of the small positioning wheel. Since these two mechanisms are substantially alike a description of one will suffice for both and the foremost switching mechanism of FIGURE 17 which controls the power supply to the large wheel will be described in detail.

As noted above, the clamping fingers of the large wheel 66 are normally in their closed condition by virtue of springs 90; that is they are in the positions of FIGURES 8 and 10 when the solenoid 80 is not energized. It follows that when it is desired to release the wire from clamped engagement it is necessary to energize the solenoid 80 to retract the plunger 78. To this end, there is provided a normally closed microswitch 140 on an arm 144 which extends from a hub 146. Switch 140 has a button projecting from its under side which is engaged by an obliquely extending leaf spring 141 secured to the switch housing. This spring extends down toward a support plate 149 and has a depending end portion 143 which is notched at 145 to straddle the wire being pulled leftwardly in FIGURE 17 by the large wheel. The ends of the arm 143 extends through a slot 147 in the support plate 149 which is secured to the bracket 152 extending from the frame plate 2.

When the parts are in the position of FIGURE 17, the insulation of the wire extending through notch 145 will hold the spring arm 143, 141 in a slightly raised position so that the switch button 142 will be depressed and the normally closed switch will be held in open condition and power will not be supplied to the solenoid 80. When the wire is moved leftwardly, however, until its stripped end is in alignment with the notch, the spring 146 will be permitted to move downwardly very slightly thereby permitting the switch button 142 to move outwardly to its normal position and the switch will be closed. Thus, when the stripped end of the wire moves up to the position of the notch of the spring, the clamps will be opened and pulling of the wire will cease.

Since the wire moves relatively swiftly while it is being drawn leftwardly in FIGURE 17, it is necessary to provide a friction drag device to reduce its speed and to bring it to a halt promptly after closing of switch 140. To this end, there is provided an arm 160 which extends from the hub 146 towards the plane of the frame plate and which has on its end a housing 162 through which a rod 164 extends. A spring 170 in the housing bears against the under side of the top of the housing at one end and against a washer on the plunger at its other end normally to bias the plunger downwardly. On its lower end, plunger 164 has a clamping plate 176 with a resilient rubber-like facing 178 bearing against the wire thereby to impose a slight pressure on the wire and create a mild frictional drag. The wire will then come to a halt by virtue of its slight frictional drag imposed thereon when the microswitch 140 is closed. It is preferable to provide means for preventing rotation of the plunger 164 in order to gain the maximum effectiveness from the drag mechanism and to this end a pin 174 extends through vertical slots in the housing and through the plunger 164.

During the periodic indexing of the chain, it is necessary to raise both the spring arm 141, 143 and the drag mechanism 164, 176 in order to permit positioning of the next wire in the conveyer chain beneath the leaf spring and pad 178. To achieve this, the previously mentioned hub 146 is mounted on a vertical reciprocable rod 148 which extends through aligned openings in ears 150 on the bracket 152 and has on its lower end a cam follower 154 in engagement with a cam 156 on a shaft 158. During each revolution of the shaft 158 the rod 148 will thus be raised by the cam thereby to raise the spring 141, 143 and the drag mechanism. A spring 159 surrounds the rod 148 and bears at its upper end against the upper one of the ears 150 and at its lower end against a collar on the rod normally to bias this rod downwardly and to hold the friction drag means 176 against the wire and the switch 140 in the position of FIGURE 17.

The substantially similar mechanism for controlling the power supply to the solenoid 132 of the small wire positioning wheel 92 is shown in plan view in FIGURE 18 and includes a microswitch 166, a spring arm 186, a housing 182, and a plunger 184. The functions of these parts are substantially the same as those of the parts which control the power supply to the large wheel. It will be noted that the wire must be drawn to the position of the notch 147 before it can pass the reciprocable rod 148.

After the lefthand end of the wire, as it appears in FIGURE 2, has been properly located with respect to the plane of the frame 2, by the small wheel 92 it is delivered to a crimping press generally indicated at 198. The disclosed embodiment of the invention shows a crimping press of a type which is shown and described in the copending application of Gilbert T. Sitz, Serial No. 142,270, filed October 2, 1961, for Connector Feeding Device although alternative types of presses can obviously be used. Terminals are supplied to the press from reels mounted on a bracket 202 (FIGURE 4), the reel itself having been omitted from the drawing in the interest of clarity. The press 198 has a ram 208 which projects above the level of the press housing and which is engaged by a laterally extending arm 206 of a vertically reciprocable connecting rod 204. This connecting rod extends downwardly through bearing bosses 210 mounted on support leg 6 and has a pivotal connection 214 at its lower end with a crank 216 on a continuously rotating shaft 218.

After application of the first connector or terminal onto the lefthand end of the wire as it appears in FIGURE 2, the wire is axially fed leftwardly in this diagrammatic figure to position the other end of the wire at the proper location for application of a terminal by a press 198' disposed on the opposite side of the frame from the press 198. Since the second large positioning wheel 66' is not capable in the disclosed embodiment of gripping the short projecting end of the wire to which the terminal has been attached, a second small positioning wheel 220 is located immediately downstream from the crimping press 198. This second small positioning wheel does not require the solenoid control of the positioning wheel 92 for the reason that its only function is to draw a sufficient amount of wire of each lead towards the rearward side of the apparatus to permit the second wheel 66' to grasp the wire. In other respects, this second small wheel 220 is constructed in the same manner as the previously described positioning wheel 92 and need not be described in detail. The second large positioning wheel 66' and the second small positioning wheel 92' perform the same functions as the wheels 66 and 92 and again need not be described in detail. These latter wheels are, of course, mounted on the opposite side of the frame from the positioning wheels 66, 92 and the control switch mechanisms for the solenoids of these wheels as well as the second crimping press are mounted on the opposite sides of the frame from their previously described counterparts as is apparent from FIGURE 1.

All of the various positioning wheels and the crimping presses as well as the indexing mechanism of the disclosed embodiment derive their power from a continuously rotating input power shaft 224 which may be driven by any convenient means such as an electric motor and speed reducer. Shaft 224 extends parallel to the plane of the frame plate 2 on the same side thereof as the first positioning wheels 66, 92. Pillow blocks 226, 228 are provided adjacent to the righthand end of the frame plate in FIGURE 3 and in the approximate center thereof to support the shaft on its lefthand end. Shaft 224 has a sprocket 232 thereon over which a chain 230 extends to a sprocket 234 on the end of the previously mentioned shaft 68 which drives the first large positioning wheel 66. Adjacent to the pillow block 226, a gear 236 is mounted on power shaft 224 which extends through an opening in the frame plate to mesh with a gear 238 on a shaft 240 on the opposite of the frame plate (FIGURE 4). Shaft 240 is connected by sprocket and chain means 242, 244, 246 with a shaft 218 which as previously mentioned extends through the crank 216 on the end of the connecting rod 204 to apply power to the applicator 198.

Referring again to FIGURE 3, shaft 68 is coupled to the input shaft of a speed reducing mechanism 248 by chain and sprocket means 250. The output shaft of the speed reducer 248 is coupled by means of a chain and sprocket 256 to the previously described shaft 96 on which the first small positioning wheel 92 is mounted. The righthand end of the shaft 68 as it appears in FIGURE 3 has a sprocket 258 thereon which is coupled by means of a chain extending through an opening in the frame plate 2 to a sprocket 260 on the end of shaft 158 (FIGURE 4). Shaft 158 has the cam 156 of FIGURE 17 mounted thereon by means of which the switch mechanism is raised during indexing of the chain 10.

The power transmission means described immediately above will thus drive the positioning wheels 66, 92 the first crimping press 198, and the first switch mechanism of FIGURE 17. The power train for the second stage of wire positioning and crimping which appears at the left in FIGURE 1 will now be described.

Shaft 96 has a gear 262 on its lefthand end in FIGURES 1 and 3 which meshes with a gear 264 on the end of a countershaft 266. A sprocket 268 on countershaft 266 adjacent to the gear 264 couples this countershaft by means of a chain 270, which extends through the frame plate, to a shaft 272 on the opposite side of the frame plate. The intermediate or second small positioning wheel 220 is mounted on the shaft 272.

The shaft 68' on which the second large wheel 66' is mounted is coupled by means of a sprocket and chain indicated at 274 to the previously mentioned shaft 240 (FIGURE 4). The final small wheel 92' which is mounted on a shaft 96' is coupled by means of a sprocket and chain 276 to the shaft 266. The second crimping press 198' is actuated by a connecting rod 204' which has an eccentric crank connection with a shaft 278. This shaft 278 in turn is directly coupled by sprockets and chains 280 with the main input power shaft 224.

The indexing mechanism 282 for periodically actuating the pawl and ratchet mechanism is coupled by means of a crank 284 to a shaft 286 which in turn is coupled to a sprocket 288 to the shaft 278.

Several salient features of the invention will be apparent from a consideration of the mode of operation as described above. One particular advantage is that no adjustments need be made to the apparatus for leads of different lengths since the sensing device of FIGURE 17 which controls the actions of the solenoids 80, 132 of the positioning wheels 66, 92 and their counterparts 66', 92' is actuated by the stripped ends of the wires. In other words the wheels pull the wires until the solenoids 80, 132 are energized regardless of the lengths of the wires so that varying lengths can be placed in the bin and will all be terminated. A further advantage of the disclosed embodiment is that the terminal being applied to the wire can be changed readily by merely removing the reels of terminals from the brackets 202, 202', placing a reel of the desired type of terminal on the bracket and threading the strip from the new reel through the crimping presses 198, 198'. Furthermore, the presses themselves can be removed and replaced by presses adapted to crimp different types of terminals if necessary. It is an additional advantage that the finished leads are neatly stacked in the tote box positioned between the apparatus so that all the operator need do is maintain a sufficient number of leads in the supply bin 44 and periodically remove the finished leads form the tote box beneath the apparatus.

It will be apparent that the conveyer and positioning aspect of the invention is not necessarily limited to usage in a lead making machine but would also have utility in the handling of other types of elongated flexible materials such as plastic tubing or woven materials including rope. Thus, the chain conveyer 10 in combination with the positioning wheels 66, 92 could be used, for example, to extract discrete sections of plastic tubing from a bundle and position the ends of the tubing sections at some predetermined distance from the conveyer for some further operations, e.g. attachment of a handle or other terminal device.

The disclosed arrangement of clamping the individual wires to the peripheries of the positioning wheels has been found to be a superior method of pulling relatively small diameter wires insulated with plastic materials which are somewhat slippery. With other types of materials, however, the disclosed positioning wheels can be replaced by conventional feed rolls in tangential contact with the material being handled. If feed rolls are used, it is necessary to provide a means for moving the rolls apart during indexing of the chain assembly 10 in order to permit the individual sections of material to be moved between the rolls.

The disclosed type of conveyer has been found to provide a convenient and effective means for moving the wires along the conveyer path however, alternative types of conveyers can be used. For example, spaced apart clamps on a chain conveyer could be employed in combination with a means for delivering a lead to each clamp as it passes a given location as shown in U.S. Patent 2,768,425. As a further alternative, the wires might be conveyed by two continuously moving endless belts running parallel to and adjacent to each other with the wires resiliently held between the belts, an arrangement which would obviate the need for clamps.

Changes in construction will occur to those skilled in the art and various apparently different modifications and embodiments may be made without departing from the scope of the invention. The matter set forth in the foregoing description and accompanying drawings is offered by way of illustration only. The actual scope of the invention is intended to be defined in the following claims when viewed in their proper perspective against the prior art.

We claim:
1. A lead making machine comprising, a conveyer movable along a predetermined path, a plurality of wire holding means on said conveyer for holding individual wires in side-by-side parallel relationship with a degree of firmness which permits movement of the individual lengths relative to said conveyer under the influence of a pulling force, wire pulling means beside said conveyer for pulling said lengths individually transversely with respect to said predetermined path, control means responsive to the position of each individual wire being pulled for deactivating said pulling means when each wire reaches a predetermined position relative to said conveyer, and crimping means disposed downstream, relative to the direction of movement of said conveyer, for crimping a terminal to one end of said wire whereby, during movement of an individual wire along said path, said wire is pulled to locate one end of said wire in said crimping means, and a terminal is crimped onto said one end when said wire arrives at said crimping means.

2. Apparatus as set forth in claim 1 wherein said pulling means comprises clamp means movable in a circular locus in a plane extending normally of said predetermined path, said clamp means being engageable with each of said wires when said clamp passes adjacent to said predetermined path, and said clamp means being disengageable from each of said wires after movement along a portion of said circular locus.

3. Apparatus as set forth in claim 1 wherein said pulling means comprises clamp means engageable with each of said wires and movable in a direction away from said predetermined path, said control means comprising electrically actuated means for engaging said clamp means with, and disengaging said clamp means from, each of said wires, and switch means responsive to the position of said one end of each of said wires for controlling said electrically actuated means.

4. Apparatus as set forth in claim 1 wherein said conveyer means comprises a chain having notches extending transversely across the links thereof for holding said individual wires, and pressure pad means bearing against said chain to contain said wires in said notches.

5. A lead making machine comprising, a chain movable along a predetermined conveying path, said chain having spaced apart notches in its external side, resilient means bearing against said external side of said chain and extending along the portion of said path over which wires are to be conveyed, means for positioning a wire in each of said notches, means for pulling said wires axially and individually during movement of said chain thereby to position one end of each wire at a predetermined distance from said path, and crimping means disposed downstream, relative to the direction of movement of said chain, from said wire pulling means, said crimping means being disposed beside said path and at said predetermined distance therefrom whereby upon arrival of said one end at said crimping means a terminal is crimped onto said one end.

6. A lead making machine comprising, lead holding and moving means for holding a lead at one point intermediate its ends and moving said lead laterally of its axis along a predetermined path, crimping means on one side of said path for crimping an electrical connector onto one end of said lead, and means for moving said lead axially past said one point to position said one end in said crimping means.

7. A lead making machine comprising, lead holding means for holding a lead at one point intermediate its ends, means for moving said holding means along a path extending transversely of the axis of a lead held in said holding means, connector applying means disposed beside said path, and means for moving said lead axially past said one point to position one end of said lead in said connector applying means when said holding means moves past said applying means.

8. A lead making machine comprising, lead holding and moving means for holding a plurality of leads at one point intermediate their ends in side-by-side parallel relationship to each other and moving said leads laterally of their axes along a predetermined path, terminal applying means located on one side of said path at a fixed distance from said path, and means for pulling each lead individually axially with respect to said holding and moving means until one end of the lead extends said fixed distance laterally of said path thereby to position said one end of each lead in said terminal applying means.

9. A lead making machine comprising conveying means movable along a predetermined path, a plurality of lead holding devices on said conveying means, each lead holding device having means for holding a lead at a point intermediate its ends, means for delivering a lead to each of said lead holding devices as they pass a first location on said path whereby each lead is moved laterally from said first location, connector applying means on one side of said path at a location downstream from said first location and axial feeding means for feeding each lead axially past said one point during movement of each lead holding device from said first location to said second location thereby to position one end of each lead in said connector applying means upon arrival thereof at said connector applying means.

10. A machine as set forth in claim 9 wherein said conveying means comprises a chain and wherein said lead holding devices comprise spaced apart notches in said chain, said machine including pressure pad means bearing against said chain thereby to contain said leads in said notches.

11. A machine as set forth in claim 9 wherein said axial feeding means comprises at least one wheel mounted for rotation on an axis extending beside said predetermined path, clamping means on said wheel, and means for engaging said clamping means with each lead whereby said lead is pulled by said clamping means past said one point.

12. A machine as set forth in claim 9 wherein said axial feeding means comprises a wheel mounted for rotation in a plane extending transversely of said predetermined path, clamping means on said wheel, and control means for engaging said clamping means with each lead when said clamping means passes adjacent to said path and disengaging said clamping means from each lead after the said one end of the lead is positioned at least approximately at said fixed distance from said path.

13. A device as set forth in claim 12 wherein said clamping means is electrically actuated, said control means comprising switch means responsive to the position of said one end of each lead.

14. A method of making electrical leads comprising the steps of grasping a plurality of wires individually intermediate their ends at one location and moving said wires serially in parallel side-by-side relationship along a predetermined path, individually pulling each wire at a first wire pulling station on said path axially and transversely of said predetermined path until the trailing end of the wire being pulled is located at a predetermined distance from one side of said path, moving each wire further along said path to a first terminal applying station located on said one side of said path and downstream from said first station, and applying a terminal onto said end at said first terminal applying station.

15. A method as set forth in claim 14 including the further steps of moving each individual lead further along said path beyond said first terminal applying station to a second pulling station, pulling each individual wire axially until the other end of each wire is positioned at a predetermined distance from the other side of said path, moving each wire to a second terminal applying station on the other side of said path, and applying a terminal onto said other end at said second terminal applying station.

16. A lead making machine comprising, lead handling means including holding and transfer means for holding a plurality of leads in spaced-apart side-by-side relationship with their axes extending parallel to each other, said handling means being movable along a path extending laterally of the axes of said leads, lead shifting means adjacent to said path for engagement with said leads to move said leads axially relative to said handling means to position one end of each lead at a predetermined distance from said handling means, and means disposed at said predetermined distance from said transfer means for crimping a terminal onto each of said leads.

17. A lead making machine comprising, continuously indexible lead handling means including a plurality of spaced-apart lead holding devices for holding a plurality of leads in spaced-apart relationship with their axes extending parallel to each other, said handling means being movable along a predetermined path from a loading station for said leads to a crimping station, means between said loading station and said crimping station for moving each of said leads axially, relative to said handling means, to position one end of each lead at a predetermined distance from said handling means, and a crimping press at said crimping station having dies located at said predetermined distance from said handling means whereby, a terminal is crimped onto said one end of each lead upon arrival of said crimping station.

18. A method of making an electrical lead comprising the steps of supporting an intermediate portion of said lead and moving said lead laterally of its axis along a predetermined path, shifting said lead axially relative to the portion thereof which is supported until one end of said lead is disposed at a predetermined distance from said intermediate portion, moving said lead past a crimping station located at said predetermined distance from said predetermined path, and crimping a terminal onto said one end of said lead at said crimping station.

19. A method of producing electrical leads serially comprising the steps of supporting an intermediate portion of each of said leads and moving said leads laterally of their axes along a predetermined path, shifting each of said leads axially relative to the portion thereof which is supported until one end of each lead is disposed at a predetermined distance from said intermediate portion, moving said succession of leads laterally of their axes past a crimping station located at said predetermined distance from intermediate portion, and crimping a terminal onto said one end of each lead at said crimping station.

(References on following page)

References Cited by the Examiner

UNITED STATES PATENTS

| | | |
|---|---|---|
| 808,067 | 12/05 | Briggs. |
| 2,736,358 | 2/50 | Burge et al. _____ 153—1 |
| 3,015,020 | 12/61 | Long _____ 29—155.55 XR |
| 3,029,494 | 4/62 | Andrew _____ 29—155.55 XR |
| 3,075,567 | 1/63 | Busler _____ 153—1 |

CHARLES W. LANHAM, *Primary Examiner.*

WILLIAM J. STEPHENSON, *Examiner.*